(12) United States Patent  
Szlam

(10) Patent No.: US 7,856,617 B2
(45) Date of Patent: *Dec. 21, 2010

(54) METHOD, SYSTEM AND COMPUTER PROGRAM PRODUCT FOR CREATING SOFTWARE FOR PROCESSING AN INSURANCE CLAIM

(75) Inventor: Aleksander Szlam, Norcross, GA (US)

(73) Assignee: ACS State and Local Solutions, Inc., Washington, DC (US)

( * ) Notice: Subject to any disclaimer, the term of this patent is extended or adjusted under 35 U.S.C. 154(b) by 986 days.

This patent is subject to a terminal disclaimer.

(21) Appl. No.: 11/412,156

(22) Filed: Apr. 25, 2006

(65) Prior Publication Data

US 2007/0260646 A1 Nov. 8, 2007

(51) Int. Cl. *G06F 9/44* (2006.01)

(52) U.S. Cl. .......... 717/106; 717/117; 717/101; 717/102; 717/110; 717/114; 706/46; 706/47; 705/4

(58) Field of Classification Search ......... 717/100–103, 717/106, 114, 110, 117; 706/45–47; 704/1–2, 704/4, 9–10; 705/4
See application file for complete search history.

(56) References Cited

U.S. PATENT DOCUMENTS

| | | | | |
|---|---|---|---|---|
| 5,272,623 A * | 12/1993 | Grubb et al. | ............ | 717/100 |
| 5,390,314 A | 2/1995 | Swanson | | |
| 5,450,545 A * | 9/1995 | Martin et al. | ............ | 717/109 |
| 5,701,400 A * | 12/1997 | Amado | ............ | 706/45 |
| 5,745,687 A * | 4/1998 | Randell | ............ | 709/201 |
| 5,768,506 A * | 6/1998 | Randell | ............ | 709/202 |
| 5,892,947 A * | 4/1999 | DeLong et al. | ............ | 717/100 |
| 5,930,512 A * | 7/1999 | Boden et al. | ............ | 717/102 |
| 6,088,677 A | 7/2000 | Spurgeon | | |
| 6,167,562 A * | 12/2000 | Kaneko | ............ | 717/109 |
| 6,223,343 B1 * | 4/2001 | Hopwood et al. | ............ | 717/101 |
| 6,247,128 B1 | 6/2001 | Fisher et al. | | |
| 6,289,513 B1 * | 9/2001 | Bentwich | ............ | 717/106 |
| 6,314,415 B1 * | 11/2001 | Mukherjee | ............ | 706/47 |
| 6,338,093 B1 * | 1/2002 | DiRienzo | ............ | 709/238 |
| 6,343,310 B1 * | 1/2002 | DiRienzo | ............ | 709/200 |
| 6,490,719 B1 | 12/2002 | Thomas | | |
| 6,505,341 B1 * | 1/2003 | Harris et al. | ............ | 717/100 |
| 6,553,429 B1 * | 4/2003 | Wentz et al. | ............ | 719/330 |
| 6,556,951 B1 | 4/2003 | Deleo et al. | | |

(Continued)

OTHER PUBLICATIONS

Title: A collaborative methodology for the the rapid development and delivery of online courses, author: Talbott et al, dated: Oct. 2002, Source: ACM.*

(Continued)

*Primary Examiner*—Chameli C Das
(74) *Attorney, Agent, or Firm*—Alston & Bird LLP

(57) ABSTRACT

A method, system and computer program product are provided for creating software that can be used when processing insurance claims. In particular, the software generated is capable of recognizing and flagging certain situations or sets of conditions when they arise in an insurance claim that is being processed. These situations or sets of conditions, as well as the type of flag, or "edit," that should be posted when each occurs, are defined in a decision table from which the software is automatically generated. A method of processing an insurance claim using the automatically generated software is also provided.

16 Claims, 5 Drawing Sheets

U.S. PATENT DOCUMENTS

| | | | |
|---|---|---|---|
| 6,601,233 B1* | 7/2003 | Underwood | 717/102 |
| 6,698,010 B1 | 2/2004 | Yamanouchi et al. | |
| 6,718,535 B1* | 4/2004 | Underwood | 717/101 |
| 6,728,947 B1* | 4/2004 | Bengston | 717/103 |
| 6,792,595 B1* | 9/2004 | Storistenau et al. | 717/110 |
| 7,013,298 B1 | 3/2006 | De La Huerga | |
| 7,272,815 B1* | 9/2007 | Eldridge et al. | 717/101 |
| 7,322,030 B1 | 1/2008 | Boodro et al. | |
| 7,356,460 B1 | 4/2008 | Kennedy et al. | |
| 7,392,162 B1* | 6/2008 | Srinivasan et al. | 703/2 |
| 7,653,893 B2* | 1/2010 | Neumann et al. | 717/101 |
| 2002/0035488 A1* | 3/2002 | Aquila et al. | 705/4 |
| 2003/0172367 A1 | 9/2003 | Kannenberg | |
| 2003/0182172 A1* | 9/2003 | Claggett et al. | 705/9 |
| 2004/0205731 A1 | 10/2004 | Junkermann | |
| 2004/0215494 A1* | 10/2004 | Wahlbin et al. | 705/4 |
| 2005/0060184 A1* | 3/2005 | Wahlbin | 705/2 |
| 2005/0192850 A1* | 9/2005 | Lorenz | 705/4 |
| 2006/0020602 A9 | 1/2006 | Morgan et al. | |
| 2007/0011654 A1 | 1/2007 | Opperman | |
| 2007/0033567 A1* | 2/2007 | Carlson et al. | 717/100 |
| 2007/0079305 A1 | 4/2007 | Duerinckx | |
| 2007/0100669 A1* | 5/2007 | Wargin et al. | 705/4 |
| 2007/0157196 A1 | 7/2007 | Goicea et al. | |
| 2008/0229290 A1 | 9/2008 | Jones et al. | |
| 2009/0125130 A1* | 5/2009 | Eldridge et al. | 700/87 |
| 2009/0287512 A1* | 11/2009 | Bonissone et al. | 705/4 |

OTHER PUBLICATIONS

Title: A performance Engineering Tool and method for distributing applications, source: ACM, author: M. Litoiu et al, publication date: Nov. 1997.*

Final Office Action dated Feb. 3, 2010 from U.S. Appl. No. 11/412,001.

Non-Final Office Action dated Sep. 30, 2009 from U.S. Appl. No. 11/412,001.

Office Action from Corresponding U.S. Appl. No. 11/412,001 dated Sep. 22, 2010.

* cited by examiner

| Claim Type: | Medical | Dental | Prescription Drug | Institutional |
|---|---|---|---|---|
| Processes Run: | VD<br>VR<br>VP<br>DB | VD<br>VR<br>VP<br>DB<br>VT | VD<br>VR<br>VP<br>DB | VD<br>VR<br>VP<br>DB |

VD = Validate Data
VR = Verify Recipient
VP = Verify Provider
DB = Determine Benefit
VT = Verify Tooth

FIG. 3

| Process: | VD_M | VD_D | VR_M | VR_D | VP_M | VP_D | DB_M | DB_D | VT |
|---|---|---|---|---|---|---|---|---|---|
| Edits: | 200<br>250<br>.<br>.<br>. | 200<br>250<br>.<br>.<br>. | 310<br>.<br>.<br>. | 320<br>.<br>.<br>. | 450<br>.<br>.<br>. | 452<br>.<br>.<br>. | ... | ... | ... |

200 = Date of Service before Effective Date of Policy
250 = Duplicate Claim
310 = Recipient not Eligible (Medical)
320 = Recipient not Eligible (Dental)
450 = Provider not authorized for this medical treatment
452 = Provider not authorized for this dental treatment

FIG. 4

Edit = 250 (Duplicate Claim)

| Condition | | | | | | | | |
|---|---|---|---|---|---|---|---|---|
| 1 | Y | N | Y | Y | N | N | Y | N |
| 2 | Y | Y | N | Y | N | Y | N | N |
| 3 | Y | Y | Y | N | Y | N | N | N |
| Result | | | | | | | | |
| Post Edit | Y | | Y | | Y | | Y | |

FIG. 5

METHOD, SYSTEM AND COMPUTER PROGRAM PRODUCT FOR CREATING SOFTWARE FOR PROCESSING AN INSURANCE CLAIM

FIELD OF THE INVENTION

Exemplary embodiments of the present invention relate generally to processing insurance claims and, more particularly, to generating software to be used when processing insurance claims.

BACKGROUND OF THE INVENTION

According to a conventional insurance claim processing scenario, a variety of processing applications must generally be applied to each insurance claim received by a claims processor in order to determine what, if any, benefit the claimant is entitled to receive. This may include, for example, validating that the data entered by the claimant is accurate, determining whether the recipient is eligible under a particular policy, or determining whether the service provider was authorized to provide the particular service, to name a few.

As these processing applications are being run, certain situations may arise that might raise a cautionary flag or cause the party processing the insurance claim to, for example, automatically deny the claim or require the assistance of someone higher up in the company. An example of such a situation may be where the date of service precedes the effective date of the policy. Alternatively, or in addition, a flag may be raised where, for example, a dental insurance claim is received for the same date of service as a medical insurance claim that indicates that the patient was hospitalized during treatment.

In order to define the situations which dictate an automatic denial of benefits or at least further review, software is constructed to analyze the myriad of factors and to identify those claims of interest. As much of claims processing is performed in an automated fashion under the control of software, both the quantity and the complexity of the software can be extensive. Since the portion of the software dedicated to identifying claims of interest of the type described above is often scattered throughout code, it is sometimes difficult to readily identify any such portions of software in order to determine the conditions that are currently being evaluated for purposes of denying benefits or flagging for further review. Furthermore, it can prove challenging for many people who are not well versed in the software code to determine from the software itself, the conditions that are being evaluated. Moreover, it can be imposing to create and integrate new software that defines new or different conditions to be considered for purposes of denying benefits or flagging for further review; even for those who can explain in general terms the parameter(s) to be considered by the new or different conditions.

BRIEF SUMMARY OF THE INVENTION

Generally described, exemplary embodiments of the present invention provide an improvement over the known prior art by, among other things, providing a method, system and computer program product for creating software that can be used when processing insurance claims. In particular, the software generated is capable of recognizing and flagging certain situations or sets of conditions when they arise in an insurance claim that is being processed. These situations or sets of conditions, as well as what type of flag, or "edit," should be posted when each occurs, are defined in a decision table from which the software is automatically generated. Exemplary embodiments of the present invention further provide a method of processing an insurance claim using the automatically generated software.

According to one aspect of the present invention a method is provided for creating software for processing an insurance claim. In one exemplary embodiment the method includes: (1) creating a decision table based on a combination of conditions defining when a respective one of a plurality of edits should be posted to the insurance claim; (2) providing the decision table to a software generator; and (3) automatically generating computer programming instructions based upon the decision table and configured to cause the respective edit to be posted based on the combination of conditions from the decision table upon execution thereof.

In one exemplary embodiment each edit comprises a code that is associated with a particular situation that is determined to have occurred based on the combination of conditions from the decision table associated with the respective edit. In this exemplary embodiment, automatically generating computer programming instructions may comprise automatically generating computer programming instructions configured to cause the code associated with the respective edit to be inserted into the insurance claim.

In one exemplary embodiment, creating a decision table is repeated for each of the plurality of edits, such that a different decision table is created for each edit based on a different combination of conditions defining when the edit, with which the decision table is associated, should be posted. In this exemplary embodiment, providing the decision table to the software generator may be repeated for each of the different decision tables. In this case, for each of the different decision tables, a different set of computer programming instructions is automatically generated that causes the respective edit, with which the decision table is associated, to be posted based on the combination of conditions from the decision table.

According to another aspect of the present invention, a system is provided for creating software for processing an insurance claim. In one exemplary embodiment, the system includes a software generator and a decision table instantiated in a memory device and accessible by the software generator. The decision table defines a combination of conditions that must be met in order for a respective one of a plurality of edits to be posted to the insurance claim. The software generator automatically generates computer programming instructions based upon the decision table and configured to cause the respective edit to be posted based on the combination of conditions from the decision table upon execution thereof.

According to yet another aspect of the present invention a computer program product is provided for creating software for processing an insurance claim. The computer program product comprises at least one computer-readable storage medium having computer-readable program code portions stored therein. In one exemplary embodiment, the computer-readable program code portions include: (1) a first executable portion for receiving a decision table that is based on a combination of conditions defining when a respective one of a plurality of edits should be posted to the insurance claim; and (2) a second executable portion for automatically generating computer programming instructions based upon the decision table and configured to cause the respective edit to be posted based on the combination of conditions from the decision table upon execution thereof.

According to another aspect of the present invention a method is provided for processing an insurance claim. In one exemplary embodiment, the method includes: (1) determining which of a plurality of processes are associated with the insurance claim; (2) determining which of a plurality of edits are associated with each of the processes associated with the insurance claim; (3) accessing a decision table for each of the associated edits based on a combination of conditions defining when the respective edits should be posted to the insurance claim during processing of the claim; (4) automatically generating computer programming instructions based upon the respective decision tables and configured to cause respective edits to be posted based on the combination of conditions from the respective decision tables upon execution thereof; and (5) evaluating the insurance claim with the automatically generated computer programming instructions.

In one exemplary embodiment, the plurality of processes include validating data, verifying that a recipient is qualified for coverage, verifying that a provider is authorized to perform a service, and determining the benefit for which a claimant qualifies. In another exemplary embodiment, determining which of the plurality of processes are associated with the insurance claim involves determining which of the plurality of processes are associated with the particular type of insurance claim.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a table illustrating various processes that may be applied to particular insurance claims in accordance with exemplary embodiments of the present invention;

FIG. 4 is a table illustrating various edits which may be posted for each of the various processes in accordance with exemplary embodiments of the present invention;

FIG. 5 is a decision table which may be defined for each of the various edits and from which software may be automatically generated in accordance with exemplary embodiments of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
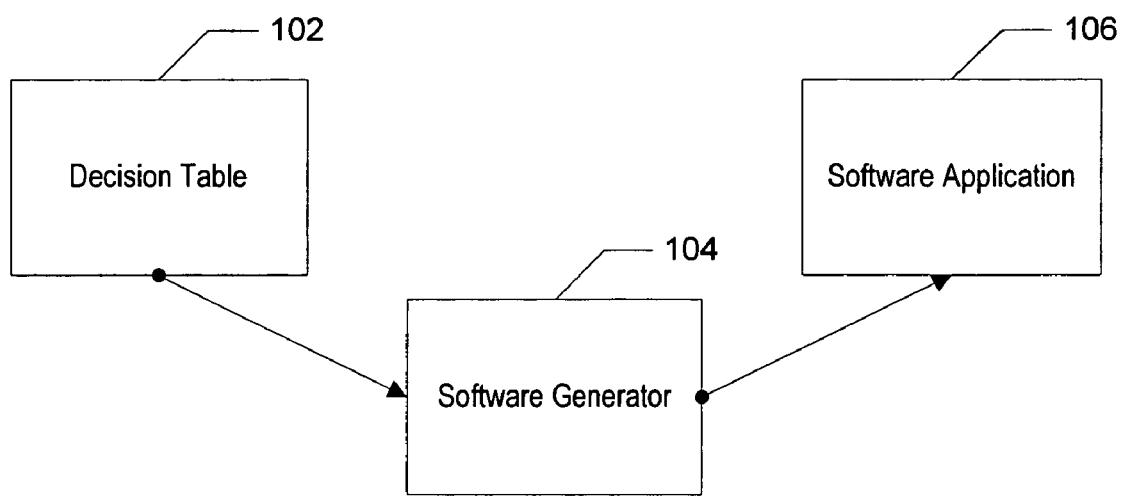
FIG. 1 illustrates a system which may be used in accordance with exemplary embodiments of the present invention.

Reference is now made to FIG. 1, which very generally illustrates a system in which exemplary embodiments of the present invention may be implemented. As shown, the system includes a decision table 102, which may be stored in a memory device and an example of which is illustrated in FIG. 5. The decision table 102 defines a set of conditions that must be met in order for a particular flag, or "edit" to be posted on an insurance claim being processed. As is discussed in more detail below, an edit is posted where, for example, a certain situation has occurred or set of conditions have been met, of which the party processing the insurance claim desires to become aware and/or treat in a certain predefined manner. For example, when processing an insurance claim, the party processing the claim may want to be notified where there appears to be a duplicate claim. An example of a duplicate claim would be where there are two dental insurance claims for the same date of service, or where a dental insurance claim is submitted for the same date of service as a medical insurance claim indicating that the claimant was hospitalized during treatment. The decision table defines the various conditions that, if met, would indicate that there has been a duplicate claim. When one or more of these conditions are met, a flag, or an edit, would be posted to the insurance claim. These edits can then be used by the party processing the insurance claim to determine what, if any, further action should be taken, such as denying the insurance claim or routing for further investigation.

Once the decision table has been defined and stored, it is fed into a software generator 104, which automatically generates a software application 106, which can then be executed to evaluate insurance claims in order to post edits where applicable. A software generator 104 is a computing application including or capable of accessing the decision table 102 in memory. The software generator 104 is capable of translating a set of instructions implied by the decision table into a computer executable set of instructions (i.e., the software application 106) and storing that set of instructions or software application for future execution. Either the same or a different computing application is capable of executing the software application 106, which is stored in the same or different memory device. In general, therefore, the software generator 104 is a computer program or set of computer executable instructions configured to create another set of computer executable instructions (i.e., the software application 106) from a set of parameters (i.e., derived from the decision table 102).

Figure 2:
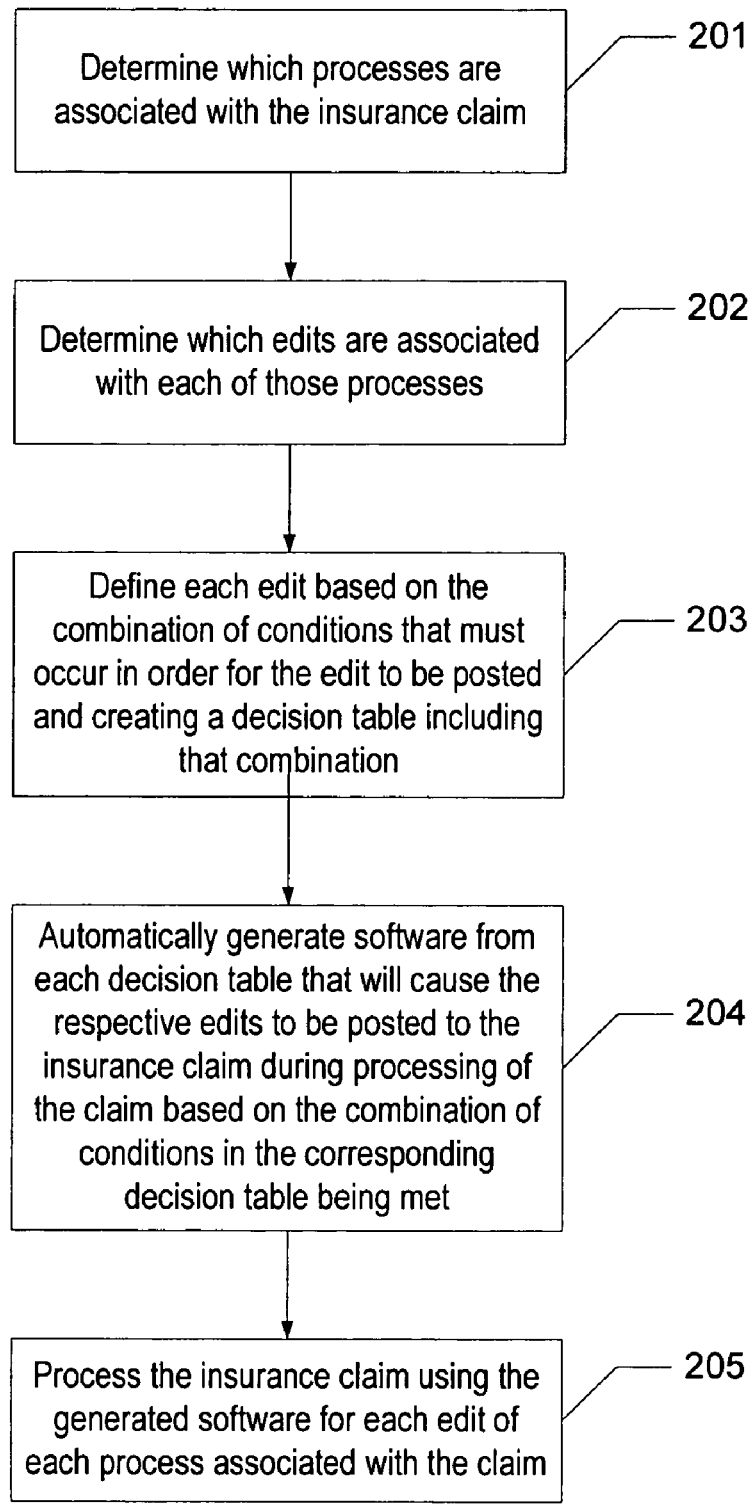
FIG. 2 is a flow chart illustrating a method of generating software to be used when processing an insurance claim in accordance with exemplary embodiments of the present invention.

FIG. 2 illustrates in more detail the steps which may be taken in exemplary embodiments of the present invention when generating software for posting edits to insurance claims being processed. As shown, the first step, Step 201, may be to determine which procedures or processes must be run for each type of insurance claim. The types of insurance claims may include, for example, medical, dental, prescription drug or institutional insurance claims. Examples of different procedures or processes that may be run on each insurance claim may include validating the data provided in the claim, verifying that the recipient is eligible for the particular coverage sought, verifying that the provider was authorized to perform the particular service, and determining the benefit, if any, for which the claimant qualifies. For each of the various insurance claim types, a different combination of processes or procedures may need to be run in order to fully process the insurance claim. FIG. 3 provides one example of the procedures which may be associated with each of the various claim types. As shown, for example, for a dental insurance claim, all of the processes listed above may need to be run in addition to verifying a tooth number provided on the insurance claim.

Once the processes have been associated with each insurance claim type, in Step 202, it may be determined which "edits" or flags are required for or associated with each process or procedure for each claim type. As discussed generally above, an edit is a situation, or set of conditions, that a party processing a particular claim would like to recognize within that claim and which may result in further action being taken.

For example, an edit may be posted where a piece of information in the insurance claim is inconsistent with another piece of information somewhere else in the claim or somewhere in the insurance processor's system. Examples of conditions for which an insurance claim processor may wish to have an edit posted may include where, for example, there appears to be duplicate claims, the provider is not authorized for a particular benefit, the date of service is before the effective date of the policy, the date of birth of the recipient appears to be wrong, the provider is not on file, or the procedure and diagnosis do not match (e.g., the diagnosis is a broken leg, while the procedure performed was on the recipient's arm).

Determining which edits should be posted for each process or procedure for each claim type is equivalent to determining what particular situations should be identified in a particular insurance claim when that claim is being processed. FIG. 4 illustrates one example of the various edits which may be defined and posted where applicable for each process for each claim type. As shown, for example, for the Validate Data process run on a medical insurance claim (VD_M), edits 200 (Date of Service before Effective Date of Policy) and 250 (Duplicate Claim) may be posted where applicable. The same edits (200 and 250) may similarly be posted when running the Validate Data process on a dental insurance claim (VD_D). By contrast, different Recipient Not Eligible edits (310 and 320) may be posted when running the Verify Recipient processes on a medical and dental insurance claim, respectively (VR_M and VR_D). As is discussed in more detail below, each edit that is posted may result in a different action being taken. As a result, each edit may be defined differently depending upon the process being run and the type of insurance claim on which the process is run.

Returning now to FIG. 2, the next step, Step 203, is to define each edit for each procedure. In general, this includes first defining various conditions that must be met in order for the edit to be posted and then creating a decision table which reflects these conditions. In particular, in one exemplary embodiment, the edit is defined by a set of conditions using various data fields from within the claim. Each condition may include, for example, a field name plus a predicate. The predicate may consist of a comparison (e.g., <, >, =, IN, etc.) plus (1) another field name, (2) a constant or fixed value, (3) a simple computation (e.g., the sum of various fields), (4) a list number (in the instance where the comparison is IN) (e.g., a list of procedures intended for children only), or (5) a system parameter, such as the effective date of the benefit plan. For example, the condition may be defined as Date of Service (i.e., the field name)<(i.e., the comparison) Date Policy Effective (i.e., another field name).

A decision table, like the one illustrated in FIG. 5, can then be generated based on a combination of such conditions. To illustrate, in the example shown in FIG. 5, Conditions 1, 2 and 3 were defined, for example, in the above-described manner. These conditions are then combined in the decision table to indicate that Edit 250 for a Duplicate Claim is only posted when: (1) conditions 1, 2 and 3 are all met; (2) conditions 1 and 3, but not 2 are met; (3) condition 3, but not 1 or 2, is met; and (4) condition 1, but not 2 or 3, is met. As shown, other combinations of conditions 1, 2 and 3 do not cause the edit to be posted.

Figure 6:
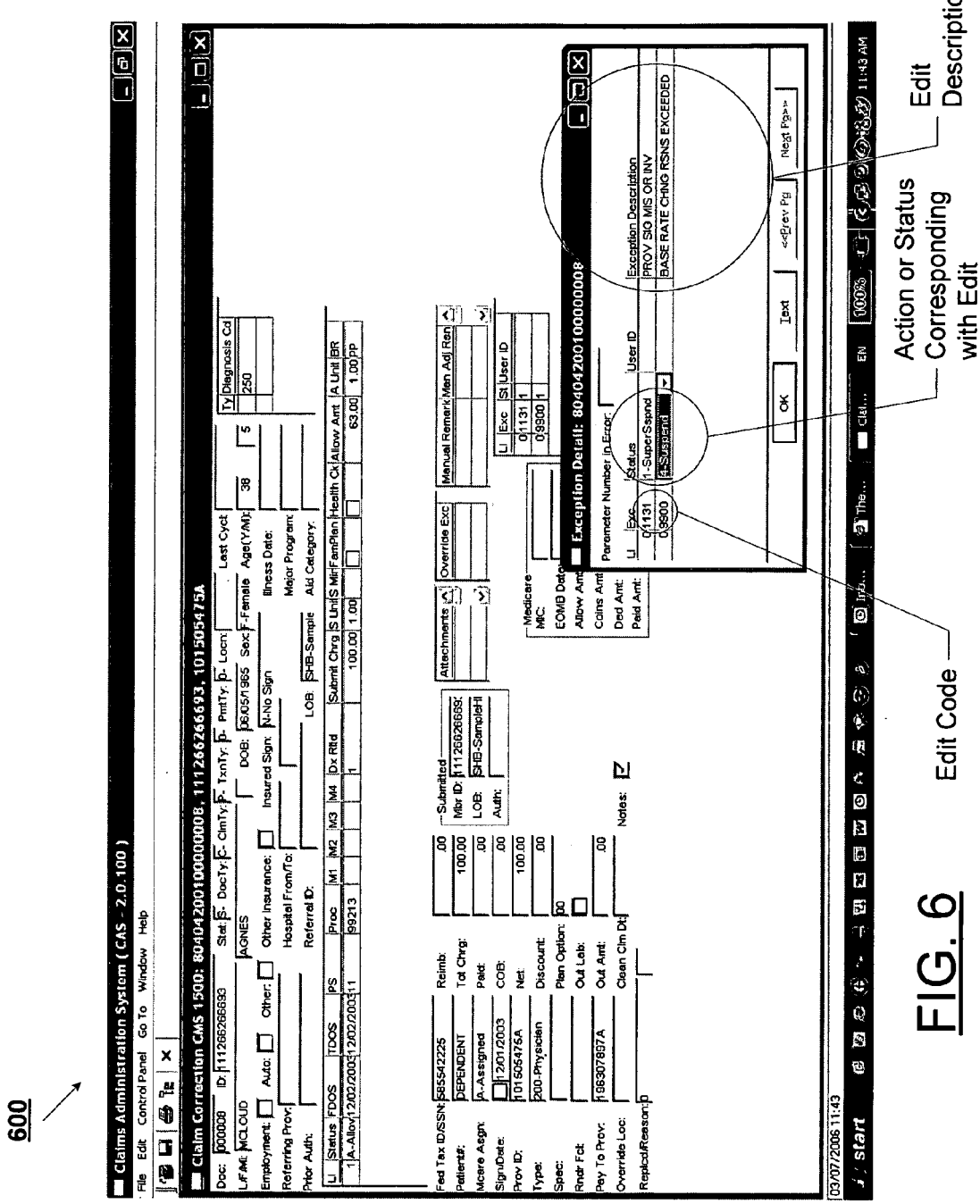
FIG. 6 illustrates an exemplary insurance claim showing an edit that has been posted in accordance with exemplary embodiments of the present invention.

In one exemplary embodiment, "posting an edit" refers to inserting a three or four digit code into the claim that is associated with a particular "edit" or occurrence. For example, the code 324, when inserted into an insurance claim may indicate a duplicate claim. FIG. 6 illustrates an exemplary insurance claim 600 where the edits "Provider Signature Missing or Invalid" and "Base Rate Change Reasons Exceeded," which correspond to codes 1131 and 9900, respectively, have been posted. As shown, the action or status corresponding with edit 9900 is to suspend the insurance claim for review. Similarly, the action or status corresponding with edit 1131 for a missing or invalid provider signature is to "supersuspend" the insurance claim. In one exemplary embodiment, this may indicate that the problem must be corrected prior to paying or denying the claim. As mentioned above, each edit may be defined differently for each procedure run for each type of claim. For example, the edit "invalid date of service" may be defined differently (i.e., the conditions that must be met in order to post this edit may be different and/or the result of the edit being posted may be different) for: (1) the procedure of verifying that a recipient is eligible for a benefit in a medical insurance claim; (2) the procedure of validating data in a medical insurance claim; or (3) the procedure of verifying that a recipient is eligible for a benefit in a dental insurance claim. Alternatively, an edit may be defined the same for the same procedure in different types of claims and/or for some of the different procedures in the same type of claim.

Returning again to FIG. 2, in Step 204, a software application is automatically generated from each decision table. As will be recognized by those of ordinary skill in the art, the software application may be written in any programming language, such as Java, XML, or COBOL, to name a few. The generated software application, when applied to an insurance claim being processed, will cause the edit with which it is associated to be posted to the insurance claim in the instance where the appropriate conditions are met, as defined by the decision table. In particular, the software generator writes additional software that causes the evaluation defined in the decision table to be performed upon execution. By way of example, the software generator effectively creates a series of if-then statements that effectuate the decision table. With reference to the decision table of FIG. 5, for example, the software generator would generate software equivalent to the following pseudocode, albeit in the programming language of choice:

```
IF (COND 1 = Y) AND (COND 2 = Y) AND (COND 3 = Y),
    THEN POST EDIT=Y
ELSE,
IF (COND 1 = Y) AND (COND 2 = N) AND (COND 3 = Y),
    THEN POST EDIT = Y
ELSE,
IF (COND 1= N) AND (COND 2 = N) AND (COND 3 = Y),
    THEN POST EDIT = Y
ELSE,
IF (COND 1 = Y) AND (COND 2 = N) AND (COND 3 = N),
    THEN POST EDIT = Y
ELSE, POST EDIT = N
```

Finally, once a software application has been generated for each edit, in Step 205, the insurance claim is processed using each of the generated software applications. Once the applicable edits have been posted to the insurance claim being processed, these edits may be used by the party processing the claim to determine what, if any, action should be taken with respect to the claim. For example, based on the edits posted, the appropriate next action may be to pay the recipient, deny the claim, suspend the claim for someone else to review, or report the claim to the appropriate individual or department. The same edit may cause a different action to be taken depending upon, for example, the surrounding circumstances or other edits posted to the same claim. In the future, for the same edit, insurance claims can just be processed without regenerating the software application from the decision table, unless the conditions that define the edit change.

Exemplary embodiments of the present invention are advantageous because they provide an intuitive way for an individual who is neither a programmer, nor a systems expert, to readily detect what the conditions are for posting various edits to an insurance claim. In addition, using exemplary embodiments of the present invention, it is easy to modify these conditions (i.e., by merely modifying the decision table). One need not be an expert to either modify or add to the conditions for posting the various edits. Finally, automatically generating software from the decision table further avoids the time consuming, and often complex, process of software authoring.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of creating software for processing an insurance claim, said method comprising:
   determining one or more processes associated with each of a plurality of types of insurance claims;
   determining a plurality of flags associated with each of the one or more processes for each type of insurance claim, wherein a flag associated with a process for a first type of insurance claim may differ from a flag associated with the same process for a second type of insurance claim;
   creating one or more decision tables, wherein a decision table is created for each of the plurality of flags based on a separate combination of conditions defining when a respective flag should be posted to the insurance claim based at least in part on a type of the insurance claim;
   providing a decision table to a software generator; and
   automatically generating with a processor computer programming instructions based upon the decision table and configured to cause the respective flag to be posted based on the combinations of conditions from the decision table upon execution thereof.

2. The method of claim 1, wherein each flag comprises a code that is associated with a particular situation that is determined to have occurred based on the combination of conditions from the decision table associated with the respective flag.

3. The method of claim 2, wherein automatically generating computer programming instructions comprises automatically generating computer programming instructions configured to cause the code associated with the respective flag to be inserted into the insurance claim.

4. The method of claim 1, wherein providing the decision table to the software generator is repeated for each of the one or more decision tables, and wherein for each of the one or more decision tables, a set of computer programming instructions is automatically generated that causes the respective flag, with which the decision table is associated, to be posted based on the combination of conditions from the decision table.

5. A system for creating software for processing an insurance claim, said system comprising:
   a software generator; and
   a memory device comprising one or more decision tables stored therein and accessible by the software generator, wherein a decision table is defined for each of a plurality of flags based on a separate combination of conditions that must be met in order for a respective flag to be posted to the insurance claim, wherein the plurality of flags is determined to be associated with one of a plurality of processes associated with one of a plurality of types of insurance claims, and wherein the respective one of the plurality of flags is posted based at least in part on a type of the insurance claim;
   wherein the software generator automatically generates computer programming instructions based upon the decision table and configured to cause the respective flag to be posted based on the combination of conditions from the decision table upon execution thereof.

6. The system of claim 5, wherein each flag comprises a code that is associated with a particular situation that is determined to have occurred when the combination of conditions from the decision table associated with the respective flag have been met.

7. The system of claim 6, wherein automatically generating computer programming instructions comprises automatically generating computer programming instructions configured to cause the code associated with the respective flag to be inserted into the insurance claim.

8. The system of claim 5, wherein for each of the one or more decision tables, the software generator automatically generates a set of computer programming instructions that causes the respective flag, with which the decision table is associated, to be posted based on the combination of conditions from the decision table.

9. A computer program product for creating software for processing an insurance claim, wherein the computer program product comprises at least one computer-readable storage medium having computer-readable program code portions stored therein, the computer-readable program code portions comprising:
   a first executable portion for receiving one or more decision tables, wherein a decision table is defined for each of a plurality of flags based on a separate combination of conditions defining when a respective flag should be posted to the insurance claim, wherein the plurality of flags is determined to be associated with one of a plurality of processes associated with one of a plurality of types of insurance claims, and wherein the respective one of the plurality of flags is posted based at least in part on a type of the insurance claim; and
   a second executable portion for automatically generating computer programming instructions based upon the decision table and configured to cause the respective flag to be posted based on the combination of conditions from the decision table upon execution thereof.

10. The computer program product of claim 9 further comprising:
    a third executable portion for enabling a user to create the decision table.

11. The computer program product of claim 9, wherein each flag comprises a code that is associated with a particular situation that is determined to have occurred based on the combination of conditions from the decision table associated with the respective flag.

12. The computer program product of claim 11, wherein automatically generating computer programming instructions comprises automatically generating computer programming instructions configured to cause the code associated with the respective flag to be inserted into the insurance claim.

13. A method of processing an insurance claim, said method comprising:

determining which of a plurality of processes are associated with the insurance claim based at least in part on a type of the insurance claim;

determining which of a plurality of flags are associated with each of the processes associated with the insurance claim, wherein a flag associated with a process for a first type of insurance claim may differ from a flag associated with the same process for a second type of insurance claim;

accessing one or more decision tables, wherein a decision table is defined for each of the plurality of flags based on a separate combination of conditions defining when a respective flag should be posted to the insurance claim during processing of the claim for each of the associated flags;

automatically generating with a processor computer programming instructions based upon the respective decision tables and configured to cause respective flags to be posted based on the combination of conditions from the respective decision tables upon execution thereof; and evaluating the insurance claim with the automatically generated computer programming instructions.

14. The method of claim 13, wherein the plurality of processes include validating data, verifying that a recipient is qualified for coverage, verifying that a provider is authorized to perform a service, and determining for what benefit a claimant qualifies.

15. The method of claim 13, wherein each flag comprises a code that is associated with a particular situation that is determined to have occurred based on the combination of conditions from the decision table associated with the respective flag.

16. The method of claim 15, wherein automatically generating computer programming instructions comprises automatically generating computer programming instructions configured to cause the code associated with the respective edit to be inserted into the insurance claim.

* * * * *